US006600992B2

(12) United States Patent
Dow

(10) Patent No.: US 6,600,992 B2
(45) Date of Patent: Jul. 29, 2003

(54) AIRPORT GROUND NAVIGATION SYSTEM

(75) Inventor: John H. Dow, Horseheads, NY (US)

(73) Assignee: Airborne Holding, LLC, Horseheads, NY (US)

( * ) Notice: Subject to any disclaimer, the term of this patent is extended or adjusted under 35 U.S.C. 154(b) by 0 days.

(21) Appl. No.: 09/860,008

(22) Filed: May 17, 2001

(65) Prior Publication Data

US 2002/0173904 A1 Nov. 21, 2002

(51) Int. Cl.[7] ................................................ G01C 21/00

(52) U.S. Cl. ....................... 701/207; 701/213; 180/167; 180/904

(58) Field of Search ................................ 701/207, 213, 701/1, 24, 25; 180/167, 168, 904; 244/50, 51

(56) References Cited

U.S. PATENT DOCUMENTS 5,107,946 A * 4/1992 Kamimura et al. ......... 180/167
6,038,496 A 3/2000 Dobler et al. .................. 701/3
6,070,684 A 6/2000 Shimizu et al. ............. 180/204
6,072,293 A 6/2000 Shimizu et al. ............. 318/432
6,212,452 B1 4/2001 Shimizu et al. ............... 701/41
6,305,484 B1 * 10/2001 Leblanc ...................... 180/167

OTHER PUBLICATIONS

The LEKTRO Difference; html; 2 pages.
Douglas Equipment Limited; LPCity Flight management System II; hhp://www.g–point.com/xpicity/fms2/features.h-tml; 3 pages.
Douglas Equipment Limited;; "Kalmar Tugmaster", 1 page.

* cited by examiner

*Primary Examiner*—William A. Cuchlinski, Jr.
*Assistant Examiner*—Olga Hernandez
(74) *Attorney, Agent, or Firm*—Brown & Michaels, PC

(57) ABSTRACT

The disclosure teaches an airport ground navigation system uses aircraft tugs and a system for centralized positive control of all aircraft ground movements. Specifically, the physical position of each tug and its associated aircraft is tracked and relayed to a central control system. The central control system handles routing, schedules and movement within the airport.

22 Claims, 1 Drawing Sheet

AIRPORT GROUND NAVIGATION SYSTEM

BACKGROUND OF THE INVENTION

1. Field of the Invention

The invention pertains to a method for navigating aircraft while on the ground. More particularly, the invention pertains to a method of using ground based vehicles to quickly and efficiently direct aircraft within an airport.

2. Description of Related Art

The traditional way for aircraft to move along the ground in an airport is under the power of their own jet engines. While these engines are efficient for air travel, one of the primary contributors to airport pollutants are the inefficient use of aircraft engines for gate starts, followed by taxi to the active taxiway and holding for take off. Airport, state, and federal authorities have advised the airlines that within about five years, aircraft will not be allowed engine gate starts. Aircraft will be towed to the active runway for start-up, and after landing will shut down for a tow to the gate. Last year there were over 200 "incursions" in the United States, where there was injury or death and aircraft damage due to aircraft mishandling on the ground. Policy decisions favoring improved environmental footprints and increased concern for airport ground incursions will drive the market to new solutions.

SUMMARY OF THE INVENTION

The present invention teaches an airport ground navigation system that will enable the safe, efficient and economical movement of aircraft between airport terminal gates and active runways. The system incorporates the use of aircraft tugs and a system for centralized positive control of all aircraft ground movements. Specifically, the physical position of each tug and its associated aircraft is tracked and relayed to a central control station. The central control station provides information directing movement of the tug. The central control station would likely be part of the control tower and handles routing, schedules and all ground traffic within the airport.

In the preferred embodiment, the tug would have an automatic steering system and be controlled remotely from the control station or by the pilot. The tug could also include an override system available to the central control station or the pilot and a proximity warning system that alerts the central control station when the tug is too close to another object.

DETAILED DESCRIPTION OF THE INVENTION

Figure 1:
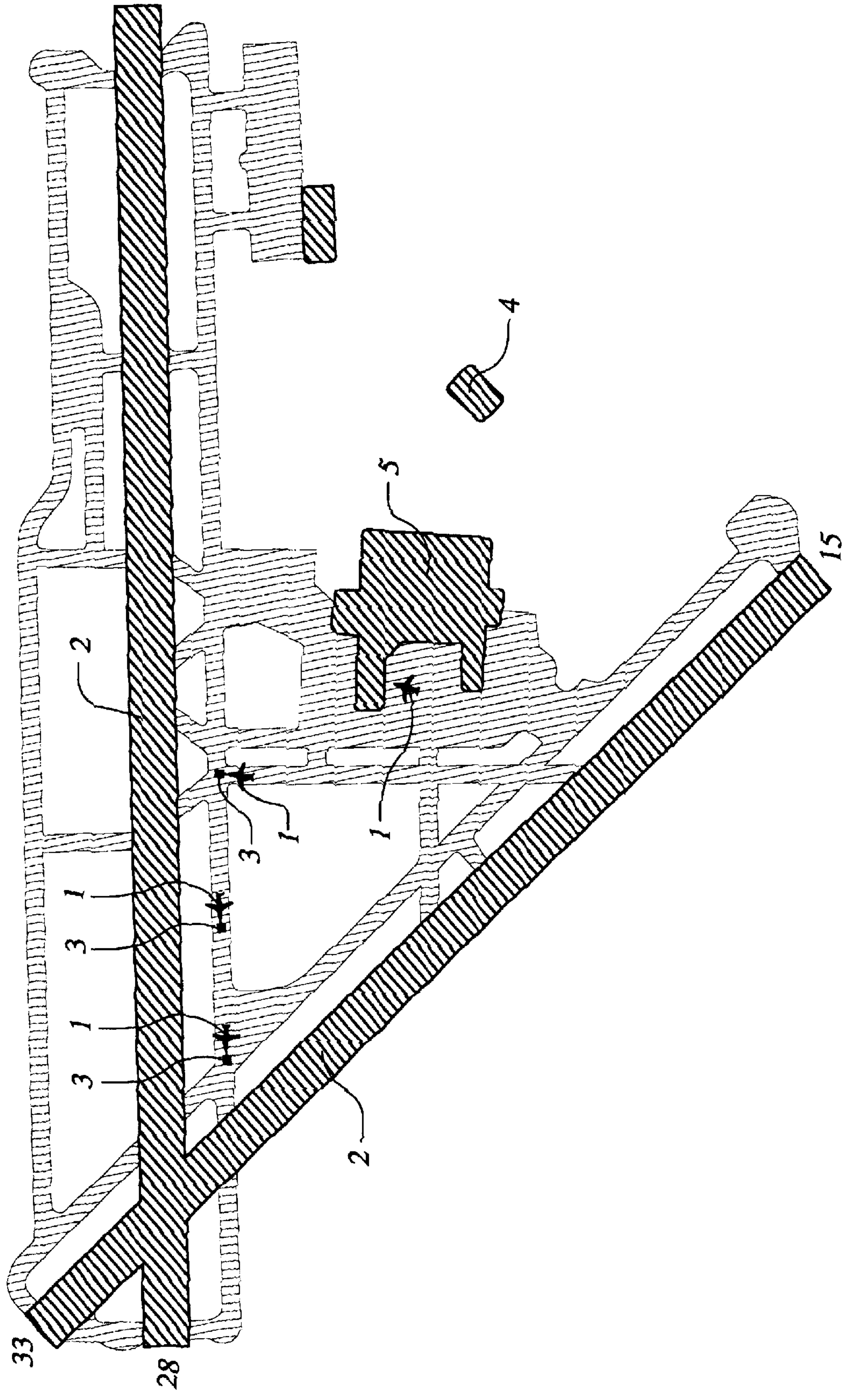
FIG. 1 shows a typical airport layout showing traffic flow of aircraft.

The present invention contemplates that aircraft will be towed to the active runway for start-up, and after landing will shut down for a tow to the gate. In such an environment it is critical that airport ground navigation still be safe and efficient, however, current technology does not provide solutions where this is possible. Tugs and methods of using them are excruciatingly slow and no reliable method had been provided for handling the ground traffic using tags for more than a few hundred feet around a gate or hanger.

Referring to FIG. 1, the present invention teaches a solution for controlling the movement of aircraft (1) between airport terminal gates (5) and active runways (2). The system incorporates the use of aircraft tugs (3) and a system for centralized positive control of all aircraft (2) ground movements. The physical position of each tug (3) and its associated aircraft (1) is tracked and relayed to a central control system, preferably at an airport traffic control center (4). The central control system handles routing, schedules and movement within the airport. Eventually, the tug (3) could be guided automatically using the location tracking system or alternatively the tug could be guided remotely by the pilot. Preferably, there will be a three-way communication among the ground control, the tug (3) and the pilots.

The Tug:

The tug will need to be capable of pulling large commercial and military aircraft at a relatively high speed. Preferably, the tug selected will be a low emission vehicle. For example, electric tugs are available from Lektro, Inc. for a variety of aircraft.

The airlines are being driven away from highly polluting diesel powered ground service equipment (GSE) to electric power (American Airlines alone has 3,500 GSE units). Rulings and regulations to ensure compliance are expected in about 5 years. Today's batteries do not provide sufficient power to accommodate larger aircraft. Fuel cell development has evolved to the point where major breakthroughs are being achieved in terms of size reduction and weight to power ratios. A tug hybrid power source is currently under development for government and commercial applications. It is expected that a hydrogen-based fuel will provide the most effective means to power the tug. This new technology is the preferred embodiment for the tug to be used with the present invention.

The tug will employ a quick (approximately 1-minute) attach and release mechanism. The tug attach/detach mechanism will utilize a universal capture mechanism that can accommodate most aircraft on the market. The method referred to as "soft capture" enables quick hookup and release. Such a system is available from Douglas Equipment, Ltd. or Lektro, Inc.

Location Tracking System:

The safety benefits of the system are primarily derived from positive control of ground movements programmed through the air traffic control tower. Optimum deployment of AGNAS is achieved once the tracking system is installed as part of the airport infrastructure. Initial operation can be executed on a case-by-case basis using tug drivers until the tracking system is complete.

Position location can be accomplished by using the existing global positioning system or another location system specific to the airport. For example, transmitters could be provided throughout the airport and the tug could include an appropriate receiver and electronics to triangulate its position. Another way of locating the tugs would be to employ painted codes on the runway surface that would be "read" by a detector on the tug similar to a bar code. Also embedded wires in the runway could provide an effective locating system. However, any system that does not provide for continuous location allows for the possibility that the tug will become "lost" between sectors on the runway. Therefore, the preferred embodiment will always be a continuous location system like a global positioning system or its equivalent.

A number of driver-less vehicle systems have been developed and more are being created. A continuous location system would allow the tug to be guided by continuous feedback signals to a steering controller. This will eliminate the need for cumbersome and expensive land-based guide rails or underground wiring. Centralized ground movement coordinators could direct the tug. Each tug will be equipped with guidance antennas that will translate the system command to detailed operating instructions. The control room will initiate starting and stopping and regulate spacing intervals for the aircraft on the ground.

Effectively, the location system would act as the "eyes" of the control room to ensure that planes would not be bumping into each other. However, it is anticipated that acceptance of the system may be hindered by ceding control of the movement of the aircraft over to an automatic system or to a controller not actually seeing the path of the aircraft. As opposed to ceding complete control of the tug to the control room, the pilot could be provided override control of the tug or be primarily responsible for directing its movements. However, in all cases the control room would track movement of the aircraft with feedback to the pilot to prevent any incursions.

Such automated steering systems are known in the art and examples are provided in U.S. Patent Nos. 6,212,452, 6,072,293, 6,070,684 and U.S. Pat. No. 6,038,496 and are incorporated herein by reference Radio Communications System:

Radio communication will be maintained between the ground control, the aircraft pilot and the tug dispatcher (responsible for attaching and releasing the tug). Minor adaptations are anticipated to ensure "need-to-know" information is conveyed among the three key elements of aircraft ground operations mentioned above. Currently, all information required by the pilot is available via the cockpit Flight Management System (FMS), including gate location, pushback time, runway selection and directions to the active runway.

System:

The present invention is modular by design and can be gradually phased-in by individual operators at specific airports, although the full system benefits will only be derived from total implementation. All essential technical components for program execution are available and minimal infrastructure investment will be necessary for implementation. Integration and adaptation of the components to this new application will yield significant environmental, economic and safety benefits. The timing is right to introduce such an airport ground navigation system drawing upon existing technology, improved GPS accuracy and the advent of dramatic hydrogen cell power advancements.

The most direct economic benefits are achieved by substituting tug movements (preferably low-emission tugs) for self-powered taxi operations to transport large aircraft over a significant portion of the distance from gates to active runways. The most important advantages of this type of movement result from: 1) using a more fuel-efficient vehicle to reduce fuel burn, and 2) reducing the time logged on aircraft engines with a proportional reduction in engine operating time resulting in lower maintenance costs. The airlines are the immediate beneficiaries of lower cost of operation.

Based on 1999 statistics, in the US alone there are 31 large hub airports (more than 6.8 million enplanements) and 37 medium hub airports (1.7–6.8 million enplanements). All of these airports have the requisite traffic volume to support AGNAS. It is expected that beyond the US market, Europe will be the second largest market for this system. The invention can also be used in military applications.

The present invention can be implemented with a relatively low initial investment. Due to the modular nature of the system, start-up could be achieved at one airport or one airline on a discrete section of their operation. Each 'leg' is a profit center later to be coordinated system-wide to derive the full safety and efficiency benefits. For example, a mechanical dispatch operation could later transition to computerized system.

The cost advantages of such a system are compelling. The illustrative example below provides some indication of the concepts economic advantages. This example takes into account only fuel savings derived from reduced aircraft taxi time.

Illustrative Fuel Savings:

Taking Seattle (SEA) airport in 1999 as an example, it was ranked 17 in the U.S. in terms of the number of enplanements. Its total annual operations were 433,660. The average taxi fuel per minute is 44 lbs (based on TU 2204-120—less than a B757 or A321-200). The number of pounds/gallon is 6.7 so the taxi gallons per minute is 6.57. The average taxi time per operation was: take off—15 minutes and landing—8 minutes. That means a total annual taxi time of 4,987,090 minutes. (15 min*216,830 TO+8 min*216,830 LDG) Estimated fuel cost is US$1.50 per gallon so the annual avoidable cost of taxi time is $49,147,772 (4,987,090 min*6.57 gal/min*$1.50 per gal) just for this one airport. Note: Fuel price sensitivity—a $0.25 increase in fuel cost translates to an $8 million annual cost increase.

Assuming 150 tugs are required, an annual cost per tug of $327,000 is justified by one year's operation.

Other Benefits:

Beyond the direct economic benefit of the system, AGNAS will also reduce the amount of pollutants emitted into the atmosphere, improving the environmental impact of airport operations by burning a more efficient fuel. In addition, the centralized "guide-bywire" dispatch of aircraft should significantly reduce the number of runway incursions that in 2000 increased by more that 25% over the prior year. The program goal is to achieve zero incursions. Safety is also greatly enhanced because positive control of aircraft on the ground will reduce the chance of runway incursions and contribute to a safer air traffic system.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of navigating aircraft while on the ground comprising:

a) providing at least one tug that will tow aircraft from one location to another within an airport;

b) moving the tug towing an aircraft while providing information of the location and movement of the tug to a central control station;

c) providing information directing movement of the tug from the central control station; and d) directing movement of the tug in the central control station based upon current location and movement information along with ground control information.

2. The method of claim 1 wherein the location and movement of the tug is determined by using a global position system receiver operatively connected to the tug.

3. The method of claim 1 further comprising communicating information regarding ground traffic control to a pilot in the aircraft.

4. The method of claim 1 further comprising communicating information regarding ground traffic control to an operator of the tug.

5. The method of claim 1 wherein movement of the tug is controlled remotely by the central control station.

6. The method of claim 1 wherein movement of the tug is controlled remotely by a pilot of the aircraft being towed by the tug.

7. The method of claim 1 wherein movement of the tug can be overridden by the central control station.

8. The method of claim 1 wherein movement of the tug can be overridden by a pilot of the aircraft being towed by the tug.

9. A control network for navigating aircraft while on the ground comprising:

a) at least one tug that will tow aircraft to and from a runway for landing and take off that includes:
   i) a position locator on the tug that determines the location and movement of the tug as the tug tows the aircraft;
   ii) a communication transmitter on the tug that transmits the information of the location and movement of the tug to a central control station; and
b) a central control station that includes:
   i) a receiver that receives the information of the location and movement of the tug;
   ii) a computer with control logic that tracks the movement of the tug and a user interface for that allows a user to provide instructions for future movement of the tug;
   iii) transmitter for transmitting instructions for further movement of the tug that is operatively linked to the computer; and
c) a proximity warning system that alerts the central control station when the tug is too close to another object.

10. The control network of claim 9 wherein the position locator is a global position system receiver operatively connected to the tug.

11. The control network of claim 9 wherein the tug also includes an automatic steering system that is responsive to the instructions for further movement of the tug transmitted from the central control station.

12. The control network of claim 9 wherein the tug also includes an automatic steering system that is responsive to instructions for further movement of the tug transmitted from a remote control unit controlled by the pilot of the aircraft being towed.

13. The control network of claim 9 wherein the tug also includes an override device to stop further movement of the tug.

14. A method of navigating aircraft while on the ground comprising:

a) providing at least one tug that will tow aircraft from one location to another within an airport;
b) moving the tug towing an aircraft while providing information of the location and movement of the tug to a central control station;
c) providing information directing movement of the tug from the central control station; and
d) wherein the location and movement of the tug information is used to provide a proximity warning system that alerts the central control center when the tug is too close to another object.

15. The method of claim 14, wherein the location and movement of the tug is determined by using a global position system receiver operatively connected to the tug.

16. The method of claim 14, further comprising planning movement of the tug in the central control station based upon current location and movement and information along with ground control information.

17. The method of claim 14, further comprising communicating information regarding ground traffic control to a pilot in the aircraft.

18. The method of claim 14, further comprising communicating information regarding ground traffic control to an operator of the tug.

19. The method of claim 14, wherein movement of the tug is controlled remotely by the central control station.

20. The method of claim 14, movement of the tug is controlled remotely by a pilot of the aircraft being towed by the tug.

21. The method of claim 14, wherein movement of the tug can be overridden by the central control station.

22. The method of claim 14, wherein movement of the tug can be overridden by a pilot of the aircraft being towed by the tug.

* * * * *